United States Patent [19]

Eichler et al.

[11] Patent Number: 4,457,508
[45] Date of Patent: Jul. 3, 1984

[54] STACK CONTROL APPARATUS FOR SHEET FEEDERS

[75] Inventors: Volker Eichler, Weinboehla, German Democratic Rep.; Werner Lein, deceased, late of Radebeul, German Democratic Rep., by Annelies Lein, heir

[73] Assignee: Veb Kombinat Polygraph "Werner Lamberz" Leipzig, Leipzig, German Democratic Rep.

[21] Appl. No.: 261,708

[22] Filed: May 8, 1981

[51] Int. Cl.³ .......................... G05B 17/24; B65H 1/18
[52] U.S. Cl. ..................................... 271/152; 414/118
[58] Field of Search .............. 271/152, 153, 154, 155, 271/156, 25, 31, 130; 318/400, 318, 443, 444; 414/118, 119

[56] References Cited

U.S. PATENT DOCUMENTS 3,125,337  3/1964  Cruzen ................................. 271/154
4,021,710  5/1977  Fichte et al. ..................... 414/118 X

FOREIGN PATENT DOCUMENTS 56-35689  4/1981  Japan ................................... 318/400

Primary Examiner—Bruce H. Stoner
Assistant Examiner—James E. Barlow
Attorney, Agent, or Firm—Michael J. Striker

[57] ABSTRACT

A stack height control apparatus for sheet feeders in sheet processing machines. The apparatus comprises a 2:1 divider connected to stack height sensors, a comparison timing stage connected to the divider, a comparator stage connected to the sensors, to the divider and to the comparison timing stage, a forward-backward shift register connected to the comparator stage and at least two timing stages each connected to the shift register and to the comparator stage. The apparatus allows automatic feeding of sheets to machines such as employed for example as printing presses.

16 Claims, 2 Drawing Figures

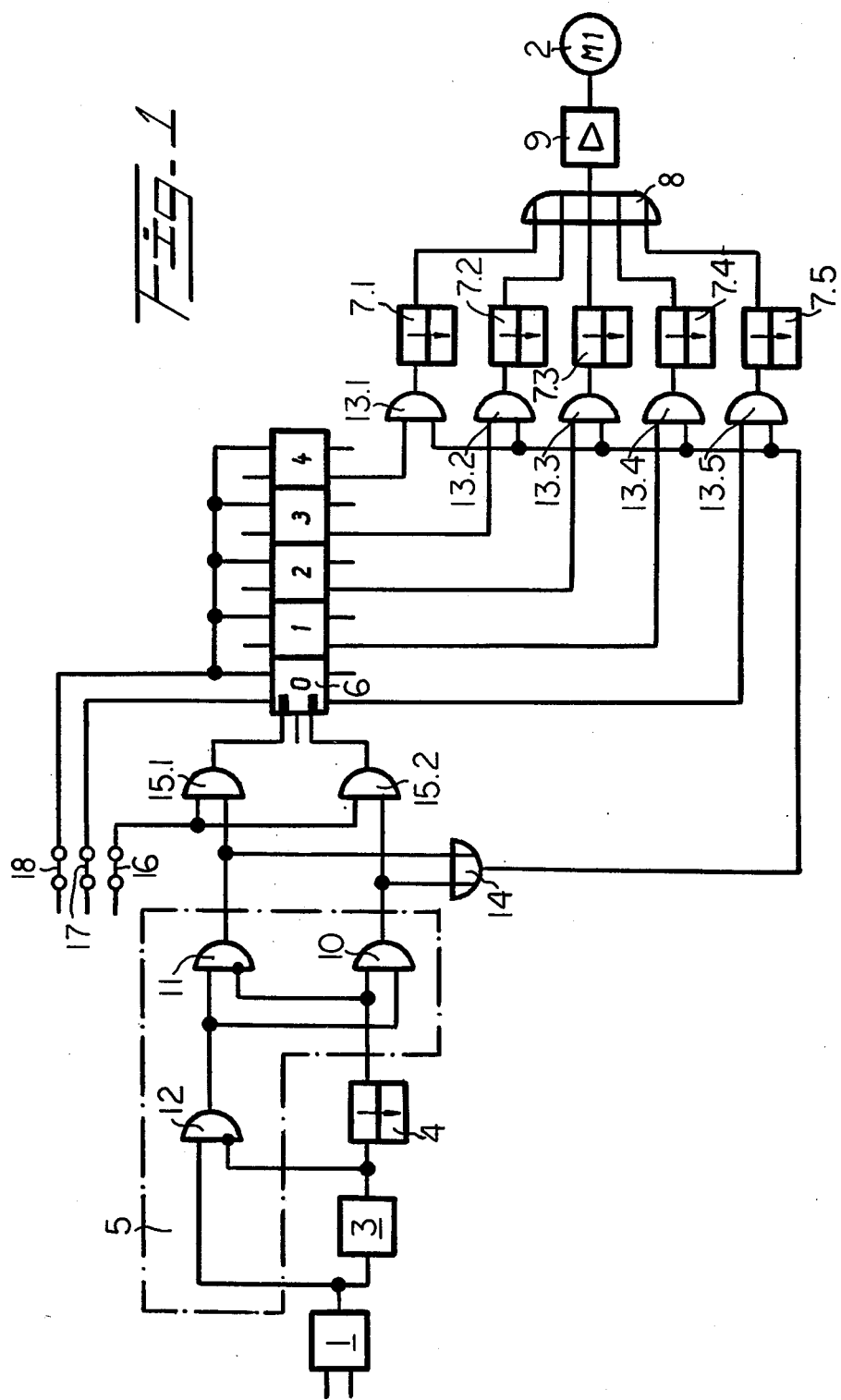

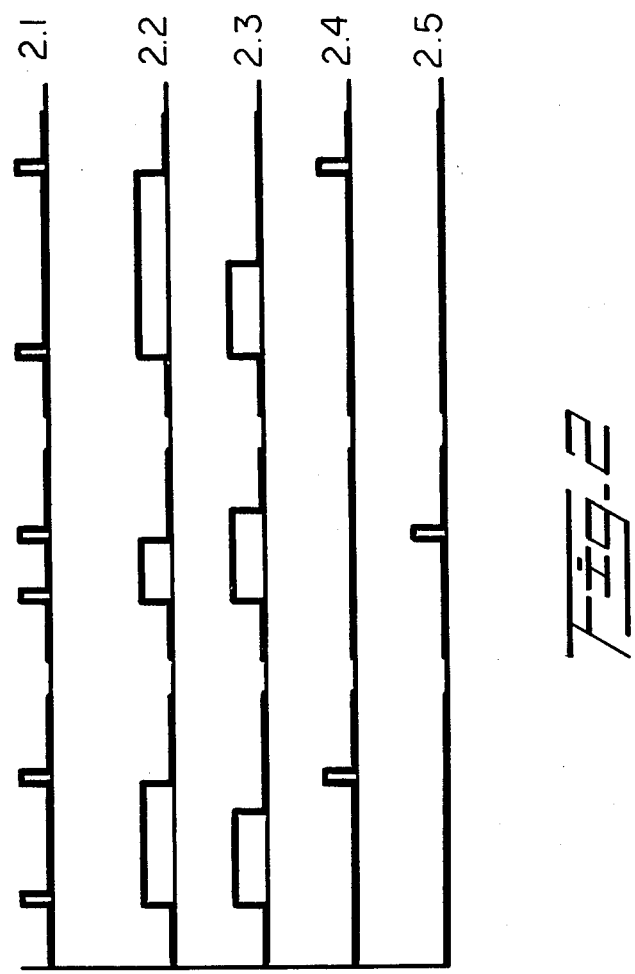

STACK CONTROL APPARATUS FOR SHEET FEEDERS

DESCRIPTION

BACKGROUND OF THE INVENTION

1. Field of the Invention

The present invention relates to an apparatus and a method for controlling the height of a stack of sheets in sheet feeders for sheet processing machines.

2. Brief Description of the Background of the Invention Including Prior Art

Apparatus for control of stack heights are known (see for example German Democratic Republic Patent DD 124786) where the condition for exact control of the stack motion is achieved by an automatic adjustment to the printing speed in several speed steps and by a manual adjustment to the thickness of the sheets to be processed.

It is a disadvantage of the above process that the adjustment of the apparatus regarding the thickness of the sheets processed is not automatic. This results in either the hourly switch-on times of the devices getting excessively high or that the deviations of the stack sizes become so large as to result in disturbances in the processing steps.

SUMMARY OF THE INVENTION

1. Purposes of the Invention

It is an object of the present invention to provide for an automatic apparatus for controlling the height of stacks of sheets.

It is another object of the invention to provide an automatic machine exactly maintaining a stack height optimal for processing with low instrumentation requirements under conditions of switching times assuring a long lifetime for the devices employed.

It is a further object of the present invention to provide a method for sensing the height of a stack of sheets and employing the resulting signals for automatic control of the height of the stack.

These and other objects and advantages of the present invention will become evident from the description which follows.

2. Brief Description of the Invention

The present invention provides a stack size control apparatus for sheet feeders in sheet processing machines such as printing machines which comprises a divider connected to a stack height sensing means, a comparison timing stage connected to the divider, a comparator stage connected to the sensing means, to the divider and to the comparison timing stage, a forward-backward shift register connected to the comparator stage and at least two timing stages each connected to the shift register and to the comparator stage.

Preferably the comparator stage comprises a third AND-gate connected to the output of the divider and connected to the output of the sensing means, a first AND-gate having inputs connected to the output of the comparator stage and to the output of the third AND-gate and having its output connected to the shift register, and a second AND-gate having its input connected to the output of the comparator stage and to the output of the third AND-gate and having its output connected to the shift register. The divider can be a 2:1 divider. Also a first OR-gate can be provided and be connected to the outputs of the timing stages, an amplifier can be provided connected to the output of the first OR-gate, and a stack lift motor can be connected to the output of the amplifier. There can be further provided a second OR-gate connected to the output of the comparator stage and synchronizing and-gates having inputs connected to the outputs of the forward-backward shift register and to the second OR-gate and having outputs connected to the inputs of at least two timing stages. Preferably, a switch "stack at top" and control AND-gates are provided, said control AND-gates having inputs connected to the outputs of the comparator stage and to the switch "stack at top" and having outputs connected to shift cycling inputs of the backward-forward shift register. A pulse generator "feeder on" can be connected to the information input of the forward-backward shift register and a pulse generator "feeder off" can be connected to the reset inputs of the forward-backward shift register.

In one aspect of the invention, the cycled stack height sensor provision comprises a 2:1 divider, a comparison timing stage, a comparator including a second AND-gate having an input connected to the output of the comparison timing stage and a second input connected to the output of a third AND-gate, which in turn has one input connected to the output of the cycled stack height sensor device and one negatived input connected to the output of the 2:1 divider, a forward-backward shift register having the outputs of the individual bits connected to timing stages realizing different running times in each case and a stack lift motor connected to the timing stages via a first OR-gate.

Synchronizing AND-gates are disposed between the outputs of the bits of the forward-backward shift register and the timing stages and the second inputs of the synchronizing AND-gates are connected via a second OR-gate to the outputs of the AND-gates.

A control AND-gate follows as well to the output of the first as to the second AND-gate and the second inputs of the control AND-gates are connected to a switch "stack at top" and the outputs of the control AND-gates are connected to the shift cycle inputs of the forward-backward shift register.

The information input of the forward-backward shift register is connected to the pulse generator "feeder on" and the reset inputs of the forward-backward shift register are connected to a pulse generator "feeder off".

There is also provided a method for controlling the stack size in a feeder for sheets which comprises sensing the height of the stack of sheets, providing cycled pulses upon too low a stack height, dividing the pulses in a 2:1 divider to provide divided pulses, in providing comparison timing pulses from a comparison timing stage triggered by the divided pulses, providing the divided pulses and the comparison timing pulses to provide incrementing and decrementing inputs for a forward-backward shift register and feeding the output of the forward-backward shift register to at least two timing stages for providing different switch-on times for a lift actuator of the stack. The outputs of the at least two timing stages can be fed into an OR-gate and the resulting output of the OR-gate can be amplified for driving a motor. Preferably the output of the forward-backward shift register and of the comparator stage are synchronized.

The invention accordingly consists of the features of construction and series of steps which will be exemplified in the device and method hereinafter described and of which the scope of application will be indicated in the appended claims.

BRIEF DESCRIPTION OF THE DRAWINGS

In the accompanying drawings, in which is shown one of the various possible embodiments of the invention:

FIG. 1 is a schematic diagram of the layout of a control apparatus for stacks of sheets; and FIG. 2 is a schematic diagram of the cycles of the electrical signals in the circuit of the present invention.

DESCRIPTION OF INVENTION AND PREFERRED EMBODIMENT

The stack control apparatus comprises a cycled sheet stack height sensing device 1, a circuit for the control of the switch-on time of the stack lift motor and the stack lift motor 2.

The circuit for the control of the switch-on time comprises a 2:1 divider 3, which is followed by a comparison timing stage 4, a comparator 5 and a forward-backward shift register 6. The outputs of the individual bits of the forward-backward shift register are connected to a coordinated timing stage 7.1, 7.2, 7.3, 7.4, 7.5 in each case and all outputs of the timing stage 7.1, 7.2, 7.3, 7.4, 7.5 are followed via a first or-gate 8 and an amplifier 9 by the stack height motor 2. The times of the timing stages are arranged such among themselves, that the time of the lower order time stage in each case is below the time in the higher ordered time stage 7.1, 7.2, 7.3, 7.4, 7.5 ($t_5 < t_4 < t_3 < t_2 < t_1$), wherein $t_1$ is the time of stage 7.1, $t_2$ is the time of stage 7.2, etc. For example, the timing stage 7.1 is associated with time t1, the timing stage 7.2 with t2, the timing stage 7.3 with t3, the timing stage 7.4 with t4 and the timing stage 7.5 with t5. The times of the timing stages 7.1, 7.2, 7.3, 7.4, 7.5 are a measure for the switch-on time of the stack lift motor 2. The comparator 5 comprises a first AND-gate 10 having its first input connected to the output of the comparison timing stage 4 and its second input connected to the output of a third AND-gate 12. The first input of the third AND-gate 12 is connected to the output of the stack height sensing device 1 and the second negatived input is connected to the output of the 2:1 divider. The input of the second AND-gate 11 is provided by the output of the third AND-gate and the negatived input of the second AND-gate 11 is connected to the output of the comparison timing stage 4. A synchronizing AND-gate 13.1, 13.2, 13.3, 13.4, 13.5 is disposed between the outputs of the individual bits of the forward-backward shift register 6 and the inputs of the timing stages 7.1, 7.2, 7.3, 7.4, 7.5, where the second inputs of the synchronizing AND-gates 13.1, 13.2, 13.3, 13.4, 13.5 are provided by the output of a second OR-gate 14. The inputs of the second or-gate 14 are provided by the outputs of the first and second AND-gate 10, 11.

To the first AND-gate as well as to the second AND-gate 10, 11 is connected the input of a control AND-gate 15.1, 15.2 in each case and the second input of the control AND-gates 15.1, 15.2 are provided by a switch "stack at top" 16. The outputs of the control OR-gates 15.1, 15.2 are connected to the shift cycle inputs of the forward-backward shift register 6.

The information input of the forward-backward shift register 6 is provided by a pulse generator "feeder on" 17. The reset inputs of the forward-backward shift register 6 are provided by the pulse generator "feeder off" 18.

In the following is described the mode of operation of the apparatus of the present invention.

In accordance with the method of the present invention, the stack height sensing device 1 is synchronized with the rotation cycle of the machine and generates in each case one pulse when the stack does not any longer have the required height (FIG. 2; 2.1). These pulses are successively fed to a comparator 5. The output signals of the 2:1 divider 3 are shown in FIG. 2; 2.2 and the output signals of the comparison timing stage 4 are shown in FIG. 2; 2.3.

To each first pulse of the cycled stack height sensing device 1 there is actuated the comparison timing stage with a constant time length signal resulting from the maximal possible switching frequency of the stack lift motor 2. The second pulse is then fed to the comparator stage 5, where it is determined if the comparison timing stage is or is not terminated at the point in time of the second pulse. In case the timing stage is already terminated, then this means that the previous lift step having its duration determined by one of the timing stages 7.1, 7.2, 7.3, 7.4, 7.5 was too big and a pulse is generated at the output of the second and-gate 11, which sets the forward-backward shift register 6 in the direction backward.

In the forward-backward shift register 6 there is in each case only one bit set to "L", the setting is performed in each case by a pulse at a time of "feeder on". At a time of "feeder off" the forward-backward shift register 6 is statically set to "O" (reset) and thus the apparatus is taken out of operation.

The position of the "L" signal in the forward-backward shift register 6 determines via the synchronizing and-gates 13.1, 13.2, 13.3, 13.4, 13.5 and the timing stages 7.1, 7.2, 7.3, 7.4, 7.5 the time of a lift step of the stack lift motor 2. When the "L" signal in the forward-backward shift register 6 is shifted to another bit, then also a different time stage 7.1, 7.2, 7.3, 7.4, 7.5 is activated. In case at the output of the second AND-gate 11 a pulse is generated, this provides for switching the "L" signal in the forward-backward shift register 6 to the next lower bit, whereby a timing stage with a shorter time is activated (FIG. 2; 2.4). In case at the point in time of the second pulse the comparison timing stage is not terminated, then a pulse is generated at the output of the first AND-gate 10 (FIG. 2; 2.5). The "L" signal is thus switched to the next higher bit in the forward-backward shift register and thereby a time stage 7.1, 7.2, 7.3, 7.4, 7.5 of longer time length is activated.

In continuous operation the duration of the lift step oscillates between two neighboring bits in each case, whereby the deviation of the nominal stack height from the true stack height is independently of the sheet thickness and of the speed maintained at an optimum value.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A stack height control apparatus for sheet feeders in sheet processing machines, comprising stack height sensing means; a divider connected to the stack height sensing means; a comparison timing stage connected to the divider; a comparator stage connected to the sensing means, to the divider and to the comparison timing stage; a forward-backward shift register connected to the comparator stage; at least two timing stages each connected to the shift register and to the comparator stage; and a stack lift motor associated to the timing stages.

2. The stack height control apparatus according to claim 1 wherein the comparator stage comprises a third AND-gate connected to the output of the divider and connected to the output of the sensing means; a first AND-gate having a first input connected to the output of the comparison timing stage and a second input connected to the output of the third AND-gate and having its output connected to the shift register; and a second AND-gate having its inputs connected to the output of the comparison timing stage and to the output of the third AND-gate and having its output connected to the shift register.

3. The stack height control apparatus according to claim 1 wherein the divider is a 2:1 divider.

4. The stack height control apparatus according to claim 1 further comprising
a first OR-gate connected to the outputs of the timing stages.

5. The stack height control apparatus according to claim 4 further comprising an amplifier connected to the output of the first OR-gate.

6. The stack height control apparatus according to claim 5 wherein the stack lift motor is connected to the output of the amplifier.

7. The stack height control apparatus according to claim 1 further comprising
an OR-gate connected to the output of the comparator stage;
synchronizing AND-gates having inputs connected to the outputs of the forward-backward shift register and to said OR-gate and having outputs connected to the inputs of the at least two timing stages.

8. The stack height control apparatus according to claim 1 further comprising
a switch "stack at top"; and
control AND-gates having inputs connected to the outputs of the comparator stage and to the switch "stack at top" and having outputs connected to shift cycling inputs of the backward-forward shift register.

9. The stack height control apparatus according to claim 1 further comprising
a pulse generator "feeder on" connected to the information input of the forward-backward shift register; and a pulse generator "feeder off" connected to the reset inputs of the forward-backward shift register.

10. A stack control apparatus for sheet feeders for sheet processing machines with a cycled sheet stack height sensor, a sheet stack lift motor and a device preceding to the stack lift motor for controlling the switch-on time of the stack lift motor, the improvement comprising
a 2:1 divider connected to the cycled sheet stack height sensor;
a comparison timing stage connected to the sensor;
a comparator stage connected to the sensor and to the 2:1 divider, the comparator comprising a first AND-gate connected to the comparison timing stage, a second AND-gate having its negatived input connected to the comparison timing stage and having another input connected to a third AND-gate, which in turn has its input connected to the cycled stack height sensor and another negatived input connected to the output of the 2:1 divider;
a forward-backward shift register connected to the comparator stage;
at least two timing stages connected to individual bits of the forward-backward shift register;
a first OR-gate connected to the timing stages, wherein the stack lift motor is connected to the first OR-gate.

11. The stack control apparatus according to claim 10 further comprising
synchronizing AND-gates disposed between the outputs of the bits of the forward-backward shift register and the timing stages; and
a second OR-gate having its inputs connected to the outputs of the first and second AND-gates and having its output connected to the second input of the synchronizing AND-gates.

12. The stack control apparatus according to claim 10, further comprising a first control AND-gate connected to the output of the first AND-gate and a second control AND-gates connected to the output of the second AND-gate, the first and the second AND-gate being connected to a switch "stack at top" and each having an output connected to the shift cycle input of the forward-backward shift register.

13. The stack control apparatus according to claim 10 further comprising
a pulse generator "feeder on" connected to the information input of the forward-backward shift register; and
a pulse generator "feeder off" connected to the reset inputs of the forward-backward shift register.

14. A method for controlling the stack height in a feeder for sheets, comprising sensing the height of the stack; providing cycled pulses upon too low a stack height; dividing the pulses in a 2:1 divider to provide divided pulses; providing comparison timing pulses from a comparison timing stage triggered by the divided pulses; providing the divided pulses and the comparison timing pulses to provide in incrementing and decrementing inputs for a forward-backward shift register; and feeding the output of the forward-backward shift register to at least two timing stages for providing different switch-on times for a lift actuator of the stack.

15. The method for controlling the stack height according to claim 14 further comprising
feeding the outputs of the at least two timing stages into an OR-gate;
amplifying the resulting output of the OR-gate; and driving a motor with the amplified output.

16. The method for controlling the stack height according to claim 14, futher comprising synchronizing the output of the forward-backward shift register and of the divided pulses.

* * * * *